Feb. 23, 1932.  B. WIENER  1,846,703
DISHWASHER
Filed May 2, 1930  3 Sheets-Sheet 1
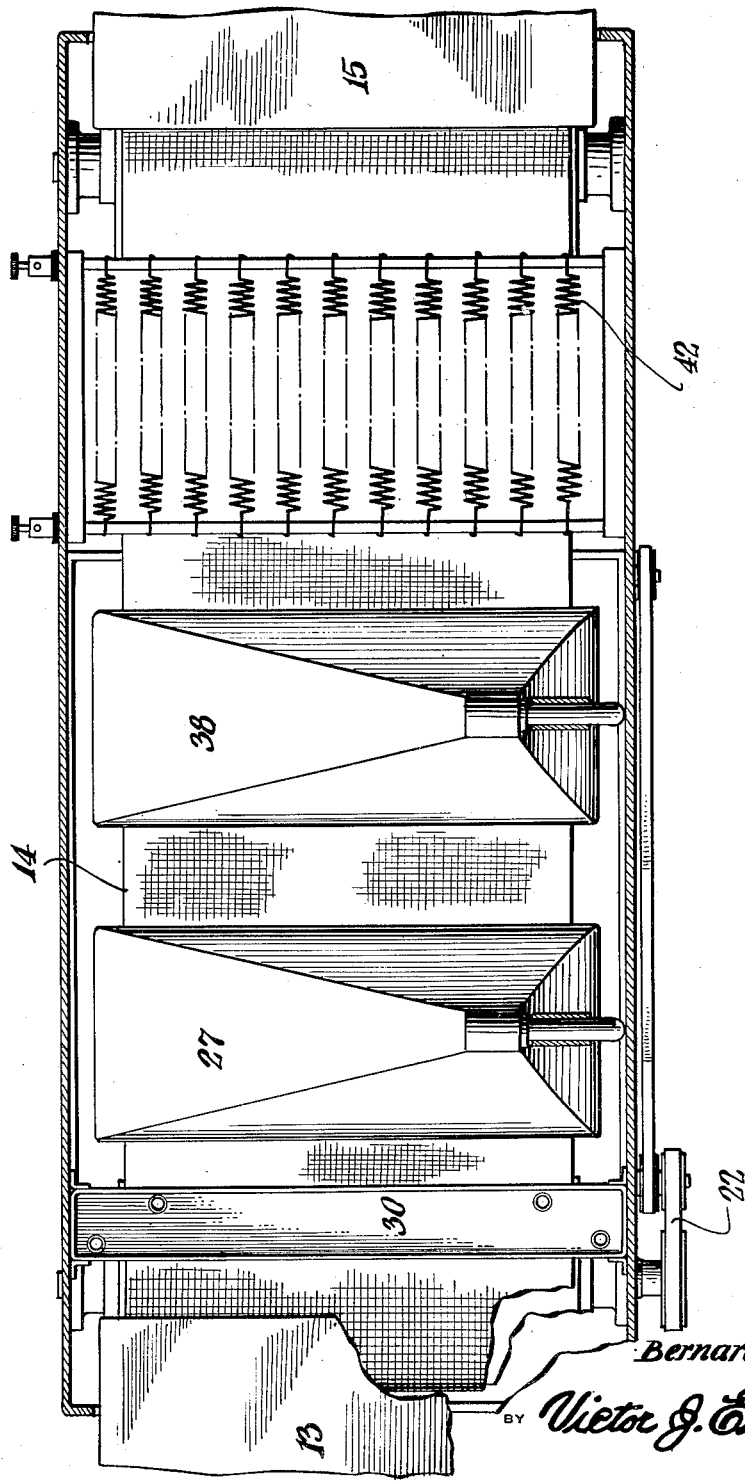

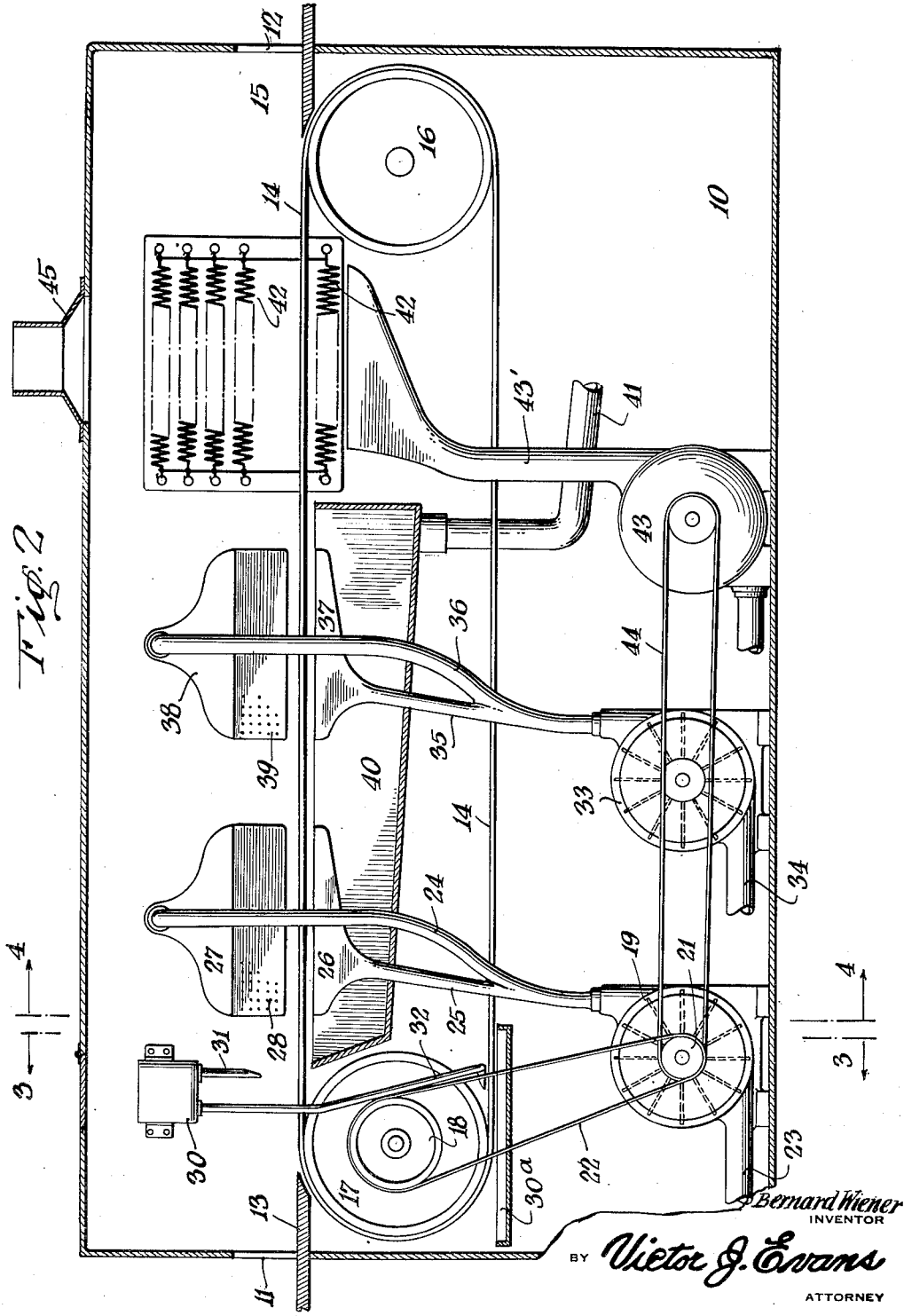

Feb. 23, 1932.                B. WIENER                1,846,703
                              DISHWASHER
                          Filed May 2, 1930        3 Sheets-Sheet 3
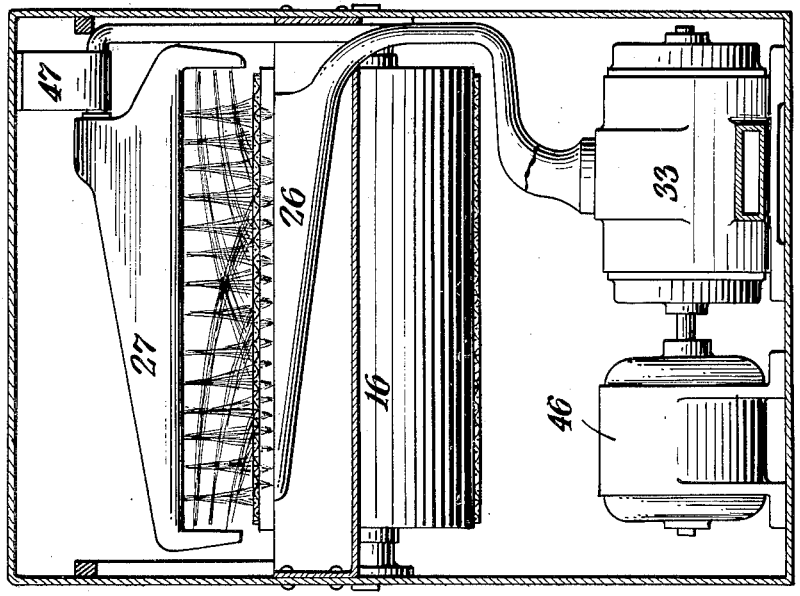
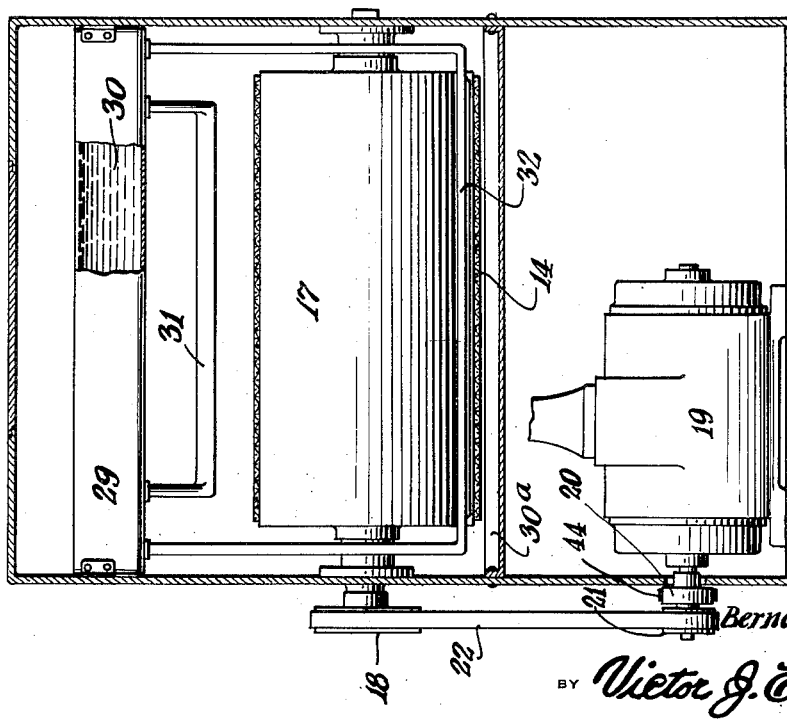
Bernard Wiener
INVENTOR
BY Victor J. Evans
ATTORNEY Patented Feb. 23, 1932

1,846,703

UNITED STATES PATENT OFFICE

BERNARD WIENER, OF BRONX, NEW YORK

DISHWASHER

Application filed May 2, 1930. Serial No. 449,242.

This invention relates to washing and drying apparatus and has for one of its objects the provision of a machine in which the constituent elements are so coordinated, structurally and functionally, as to assure improved results with material which may be constructed and erected at a reasonable cost.

Another object of the invention is the provision of a device of the class described which, while particularly suitable for washing large quantities of articles or dishes, after use in restaurants or like places, is also effective to dry the said articles and quickly prepare the same for use on second and subsequent occasions, so that the total quantity of such articles required may be thereby considerably reduced.

Since the cleansing fluid or water is generally available under pressure, and since heating means are generally provided for the water, the water may be utilized for supplying power to the apparatus, which includes a conveyor or carrier for the dishes, to secure a further object of the invention.

Since the carrier is of the openwork character, or consists of an endless wire mesh strip or belt, and since the apparatus includes a device for delivering soap or liquid cleansing material to the under side of the belt, a still further object of the invention is to deliver part of the water from the said side, as well as from the top and laterally, so that the articles to be washed may be quickly placed, without trays or separate containers, except these latter be also of the wire mesh type, on the carrier in any convenient position.

Other objects and advantages of the invention will be hereinafter specifically pointed out, or will become apparent, as the specification proceeds.

With the above indicated objects in view, the invention resides in certain novel constructions and combinations and arrangement of parts, clearly described in the following specification and fully illustrated in the accompanying drawings, which latter show embodiments of the invention as at present preferred.

In said drawings:

Fig. 1 is a top plan view of my improved washing and drying device, in which some parts are shown in section;

Fig. 2 is a lateral elevational view, in which some parts are also shown in section;

Fig. 3 is a vertical sectional view on the line 3—3 of Fig. 2; and

Fig. 4 is a vertical sectional view on the line 4—4 of Fig. 2.

Referring particularly to the drawings, the casing 10 of the apparatus is provided at opposite ends thereof with doorways or openings 11 and 12, on the base boundary edges of which rest a platform 13, from which articles to be washed are moved to an openwork or wire mesh belt or strip 14, which is endless; and a receiving platform 15. This belt is supported on spaced revolvable rollers or drums 16, 17, to dispose the top section or portion of the belt in horizontal condition, for carrying articles to be washed, the drum 17 being provided with a pulley 18.

Positioned at the base of the casing is a turbine 19 on the shaft of which is a pair of pulleys 20 and 21, the latter being connected by a belt 22 with the pulley 18; and while the turbine has connected thereto a pipe or conduit 23 through which water under pressure, in this case hot water, is supplied to operate the turbine, the latter has also rising therefrom branched pipes or conduits 24, 25 through which the water passes to a pair of sections 26, 27 of a water spraying device. Both of these devices are hollow and are provided with suitably disposed nipples, as at 28, to project the water at various angles against articles positioned on the belt, it being noted that one of the sections is below the top section of the belt.

The casing 10 has supported thereon a container 29, which carries soap or liquid cleansing material 30. One pipe or delivering member 31 of this container is positioned above the article, not shown, to be moved on the belt, while another member 32 is positioned adjacent the top of the bottom section of the belt, so that as this latter section is moved to the top, during revolution of the drums, the said section carries the cleansing material below the articles. Therefore, as hot water from the turbine is delivered through both of the sections 26 and 27, the cleansing material is applied, with the water, from both sides of the belt and, in fact, from all angles, since the nipples are disposed at various angles. A tray 30a collects any excess soap or drippings.

Another turbine 33 has connected therewith a pipe or conduit 34, which delivers hot or cold water through pipes 35 and 36 and sections 37 and 38 to the articles that have been washed in the hot water, during movement of the belt. The cold water rinses the articles and removes any trace of cleansing material therefrom, as the said articles are moved between the sections 37, 38, which later are provided with nipples 39. Water moving from the washing devices is received in a receptacle 40 and removed through a drain pipe 41.

After movement through the sections 37, 38, the articles are passed through a heating and drying device which includes heating coils 42, some of which are positioned above and some below the belt 14. In order to thoroughly and rapidly heat and dry the article a blower 43 is provided. This blower which is preferably operated by a belt 44 and the pulley 20, is provided with a hollow pipe for moving air heated by the coils 42, past the articles on the belt, to expedite the drying operation. The casing may be provided with a flue 45 above the heating device.

A turbine 33 may have connected therewith, for operating the same, an electric generator 46. The sections of the water spraying devices may be provided with any suitable supports, such as 47 and the various conduits for the water are provided with control means or cocks, not shown.

The hereinbefore described construction admits of considerable modification without departing from the invention; therefore, it is the wish not to be limited to the precise arrangements shown and described, which are as aforesaid, by way of illustration merely. In other words the scope of protection contemplated is to be taken solely from the appended claim, interpreted as broadly as is consistent with the prior art.

What is claimed as new is:

In a dish washing machine, an endless movable open carrier comprising upper and lower flights, means for supplying water to articles on the upper flight of the carrier from points above and below said upper flight, and means for supplying soap to the upper surface of the lower flight of the carrier.

In testimony whereof I hereby affix my signature.

BERNARD WIENER.